Patented Jan. 7, 1947

2,413,676

UNITED STATES PATENT OFFICE 2,413,676

PROCESS OF PURIFYING DEXTROSE SUGAR SOLUTIONS

Abraham Sidney Behrman, Chicago, Hilding B. Gustafson, Hinsdale, and James C. Hesler, Chicago, Ill., assignors to Infilco Incorporated, Chicago, Ill., a corporation of Delaware No Drawing. Application August 14, 1942, Serial No. 454,874

5 Claims. (Cl. 127—46)

This invention relates to the purification of aqueous solutions and has reference more particularly to a process of refining or purifying dextrose solutions containing contaminating metallic ions such as iron and copper.

In the acid conversion of starch products, a slurry of starch is subjected to the action of hydrochloric acid or other, inorganic acids to convert the starch to dextrose. In the starch conversion process, there are produced a relatively large number of complex organic bodies which are not dextrose and a conversion liquor is highly acid by reason of the residual or remaining conversion acid not taken up by the hydrolysis reaction.

In the pending application of Henry A. Vallez entitled "Process for refining and purifying of sugar juices," Serial No. 396,083, filed May 31, 1941, now Patent No. 2,388,194, the proposal is made that sucrose sugar juices be purified by first subjecting the raw sugar juice to a liming and carbonation process whereby the pH of the juice is brought to approximately 7 or near neutrality. The still relatively impure sugar juice is then passed through a bed of hydrogen exchange material such as hydrogen carbonaceous zeolite, then through a bed of activated carbon to remove certain colloidal matter and colored bodies, and then through a bed of acid adsorption resin to remove the free acid in the juice which is liberated when the bases or metals are taken up by the hydrogen carbonaceous zeolite. The resulting purified juice is then sent to the evaporator for evaporation to a palatable syrup or the production of granulated sugar by conventional methods.

We have experimented with treating highly acid converter liquid containing dextrose and complex organic impurities and find that the acid may be removed from the solution by passing through a bed of acid adsorbing resin. It has been found, however, that the non-sugar organic impurities of the converter liquid should be previously removed by passing the converter liquid through a bed of active carbon to remove the organic impurities of a non-sugar character which would otherwise interfere with the regeneration of the resin acid adsorbing bed. After the acid adsorbing bed is exhausted, it is regenerated by first rinsing out the acid adsorbing bed with water and then passing a dilute solution of sodium hydroxide or other alkali first through the acid adsorbing bed and then through the bed of active carbon to remove impurities from both the acid adsorbing bed and the active carbon and regenerate said beds for future use. The active carbon bed may be rinsed with water after regeneration to remove excess alkali and then a small quantity of acid such as sulfuric or hydrochloric acid may be passed through the active carbon bed to remove the last traces of alkali.

We have found that the converter liquid not only contains organic impurities which are non-sugar in character, but also contains iron and copper, and these metallic ions have a tendency to accumulate in the bed of acid adsorption resin and eventually interfere seriously with the regeneration of said acid adsorbing bed by the means of the alkaline solution. In view of the fact that this converter liquid is highly acid and contains approximately 1500 P. P. M. of free acid there was considerable doubt whether these metal ions could be removed prior to the treatment of the converter liquid with the active carbon, by passing the solution through a bed of hydrogen carbonaceous zeolite. However, we have made the surprising observation that these ions may be removed from the converter liquid by passing the liquid through a bed of hydrocarbon carbonaceous zeolite, provided the hydrogen carbonaceous zeolite is subsequently regenerated with a still stronger acid than that present in the converter liquid.

In order to exemplify the process, we passed approximately 500 ml. of converter liquid through a 50 ml. bed of hydrogen carbonaceous zeolite which had previously been regenerated with 300 ml. of half normal hydrochloric acid and washed. The rate of flow was equivalent to one gallon per square foot area per minute. Samples of the effluent were analyzed and compared with the influent content of copper and iron. The results obtained are indicated below:

| Sample | Acidity | Iron, P. P. M. | Copper, P. P. M. |
|---|---|---|---|
| Influent | 0.031 N | 10 | 16 |
| Effluent | .031 N | 1 0 | .7 |

1 Trace.

When the removal of copper and iron from the converter liquid was found to be feasible, a number of runs were made on a synthetic solution containing no dextrose but containing the amount of copper, iron and acid found in the converter liquid. The following table indicates the results obtained in this experimental run using a synthetic solution of iron, copper and acid, but containing no dextrose, but containing the amount of copper, iron and acid found in the converter liquid.

*Influent characteristics*

| Acidity | 0.031 N. HCl |
|---|---|
| Cu | 17.5 P. P. M. |
| Fe | 13.0 P. P. M. |

| No. | Volume, in liters | Fe | | Cu | |
|---|---|---|---|---|---|
| | | P. P. M. | Mgm. | P. P. M. | Mgm. |
| 1 | 0–1.0 | 0.2 | 0.2 | 0.6 | 0.6 |
| 2 | 1.0–2.0 | .2 | .2 | .5 | .5 |
| 3 | 2.0–3.0 | .2 | .2 | .45 | .45 |
| 4 | 3.0–4.0 | .2 | .2 | .5 | .5 |
| 5 | 4.0–5.0 | .3 | .3 | .6 | .6 |
| 6 | 5.0–6.0 | .7 | .7 | .9 | .9 |
| 7 | 6.0–7.0 | 1.8 | 1.8 | 3.25 | 3.25 |
| 8 | 7.0–7.25 | 2.8 | .7 | 4.5 | 1.12 |
| | | | 4.3 mgm. | | 7.9 mgm. |

Effluent Aliquot: 7.25 l.   Regeneration: 300 ml. N/2 HCl

| | Fe | Cu | | Fe | Cu |
|---|---|---|---|---|---|
| Cations recovered | 0.7 P. P. M. / 5.1 mgm. | 1.2 P. P. M. / 8.7 mgm. | Cations recovered | 80 P. P. M. / 80 mgm. | 120 / 120 |

| | Fe | Cu |
|---|---|---|
| Cations introduced, mgm | 93.0 | 127.0 |
| Cations in effluent, mgm | 5.1 | 9.0 |
| Cations recovered in spent reg'nt | 80.0 | 120.0 |
| Per cent removal cations [1] | 94.5 | 93.0 |

[1] Determined from: $\frac{\text{cations introduced less residual cations}}{\text{cations introduced}}$ It will be noted that an efficiency of 94½% was obtained in the removal of the iron ion and an efficiency of 93% in the removal of copper ion, which results were highly gratifying in view of the fact that the converter liquid is so strongly acid.

In order to make certain that the hydrogen zeolite would continue to remove the copper and iron ions with unimpaired efficiency over a long period of time, a sample of hydrogen carbonaceous zeolite was employed in an automatically operated device wherein the zeolite was exhausted and regenerated without interruption for a large number of cycles. The material was subjected to 50 cycles of continuous regeneration and exhaustion. Each cycle consisted of regeneration with 300 ml. of N/2 hydrochloric acid and of exhaustion at 1.25 gallon per square foot per minute rate on a synthetic water solution containing 0.03 N hydrochloric acid and 10 to 15 P. P. M. respectively of ferrous iron and copper. A sample of the effluent water at different points of the bed exhaustion gave values of copper and iron which agree closely with the results of the manual tests heretofore described in detail. At the termination of 50 cycles of 4 hours each, the material was again tested manually and it was found that there was no falling off in capacity at the end of the 50 cycles. Tests were also made using sulfuric acid for regeneration of the hydrogen carbonaceous zeolite and it was found that the sulfuric acid could be used as a regenerant and produced only slightly lower efficiencies in removal of iron and copper ions by the hydrogen carbonaceous zeolite. The sulfuric acid is slightly to be preferred for regeneration since hydrochloric acid is extremely corrosive to iron and steel.

It is obvious from the preceding description that our improved process will operate satisfactorily whether or not the solution being treated contains dextrose and organic impurities. The process may be applied to acid water in general.

The term "a substantial quantity of free acid" or "a strongly acid solution," which is used to designate the type of solution being treated, indicates a solution of the type specified in the example, namely, one of about .03 normal, which is the equivalent of a solution with a pH of about 1.5. The term "materially stronger," used in connection with the strength of the regenerating acid, is used to designate the relative strength of regenerating acid solution. It is believed obvious, as shown in the example, that the strength of the regenerating solution may be of the order of a .5 normal solution.

We would state in conclusion that while the examples illustrated constitute practical embodiments of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:

1. In the method of purifying a strongly acidic convertor liquor containing dextrose and nonsugar impurities including a trace of iron and copper, organic impurities and a substantial quantity of free acid, by treatment with an acid adsorbing resin, the step of first removing substantially all of said iron and copper by passing said solution through a bed of hydrogen exchange material prior to said treatment of said solution with the acid-adsorbing resin.

2. The method of removing substantially all of the iron and copper from a dextrose convertor liquor of a pH of the order of about 1.5 and containing traces of iron and copper, which comprises passing said liquor through a body of cation exchange material operating on the hydrogen cycle.

3. The method of treating convertor liquor of a pH of the order of about 1.5 and containing traces of iron and copper to remove substantially all of the iron and copper therefrom, which comprises treating said liquor with a cation exchange material operating on the hydrogen cycle and thereafter treating the so purified liquor with an anion-exchange material operating on the hydroxyl cycle.

4. The method of removing substantially all of the iron and copper from a strongly acid convertor liquor containing traces of iron and copper, which comprises treating said convertor liquor with a hydrogen exchange material.

5. The method of purifying a strongly acid convertor liquor containing dextrose, organic impurities and traces of iron and copper, which comprises first removing substantially all of the iron and copper by passing said liquor through a bed of hydrogen carbonaceous exchange material which has previously been regenerated with an acid solution materially stronger than the acidity of said convertor liquor, and then removing substantially all of the acidity therefrom by passing said convertor liquor through a bed of anion exchange material.

ABRAHAM SIDNEY BEHRMAN.
HILDING B. GUSTAFSON.
JAMES C. HESLER.